US008479186B2

(12) United States Patent  (10) Patent No.: US 8,479,186 B2
Jogand-Coulomb  (45) Date of Patent: Jul. 2, 2013

(54) METHOD FOR PROGRAM CODE EXECUTION WITH MEMORY STORAGE CONTROLLER PARTICIPATION

(75) Inventor: Fabrice Jogand-Coulomb, San Carlos, CA (US)

(73) Assignee: SanDisk Technologies Inc., Plano, TX (US)

( * ) Notice: Subject to any disclaimer, the term of this patent is extended or adjusted under 35 U.S.C. 154(b) by 1680 days.

(21) Appl. No.: 11/316,008

(22) Filed: Dec. 22, 2005

(65) Prior Publication Data

US 2007/0150885 A1 Jun. 28, 2007

(51) Int. Cl.
*G06F 9/45* (2006.01)

(52) U.S. Cl.
USPC ........... 717/168; 717/170; 717/174; 717/175; 726/8; 726/9

(58) Field of Classification Search
USPC ................ 717/168–170, 174, 175; 726/8, 9
See application file for complete search history.

(56) References Cited

U.S. PATENT DOCUMENTS

| | | | |
|---|---|---|---|
| 4,458,315 A | 7/1984 | Uchenick | |
| 4,471,163 A | 9/1984 | Donald et al. | |
| 4,593,353 A | 6/1986 | Pickholtz | |
| 4,599,489 A | 7/1986 | Cargile | |
| 4,634,807 A * | 1/1987 | Chorley et al. | 705/55 |
| 4,799,635 A | 1/1989 | Nakagawa | |
| 4,953,353 A | 9/1990 | Lederman | |
| 5,070,479 A | 12/1991 | Nakagawa | |
| 5,148,534 A | 9/1992 | Comerford | |
| 5,212,369 A | 5/1993 | Karlisch et al. | |
| 5,343,524 A | 8/1994 | Mu et al. | |
| 5,386,369 A | 1/1995 | Christiano | |
| 5,570,315 A | 10/1996 | Tanaka et al. | |
| 5,636,281 A | 6/1997 | Antonini | |
| 5,691,928 A | 11/1997 | Okaya et al. | |
| 5,692,049 A | 11/1997 | Johnson et al. | |
| 5,774,397 A | 6/1998 | Endoh et al. | |
| 5,812,662 A | 9/1998 | Hsu et al. | |
| 5,812,980 A | 9/1998 | Asai | |
| 5,854,891 A | 12/1998 | Postlewaite et al. | |
| 5,867,579 A | 2/1999 | Saito | |
| 6,046,935 A | 4/2000 | Takeuchi et al. | |
| 6,055,314 A | 4/2000 | Spies et al. | |
| 6,128,774 A * | 10/2000 | Necula et al. | 717/146 |
| 6,169,976 B1 | 1/2001 | Colosso | |
| 6,289,455 B1 | 9/2001 | Kocher et al. | |
| 6,373,746 B1 | 4/2002 | Takeuchi et al. | |
| 6,402,028 B1 * | 6/2002 | Graham et al. | 235/380 |
| 6,456,528 B1 | 9/2002 | Chen | |

(Continued)

OTHER PUBLICATIONS

"Eracom Integrates Rainbow's iKey into Protect for Token Offering", *Eracom Press Release*, (Mar. 28, 2003).

(Continued)

*Primary Examiner* — Wei Zhen
*Assistant Examiner* — Matthew Brophy
(74) *Attorney, Agent, or Firm* — Jenkins, Wilson, Taylor & Hunt, P.A.

(57) ABSTRACT

Method for executing application program code is provided. The method includes loading a first segment of the application program code from a memory storage device to a host system memory; executing the first segment, wherein a host system processor executes the first segment; and authenticating application program code execution by requiring a memory controller of the memory storage device to participate in application program code execution.

32 Claims, 8 Drawing Sheets

U.S. PATENT DOCUMENTS

| | | | |
|---|---|---|---|
| 6,480,959 B1* | 11/2002 | Granger et al. | 713/189 |
| 6,522,580 B2 | 2/2003 | Chen et al. | |
| 6,671,808 B1 | 12/2003 | Abbot et al. | |
| 6,771,536 B2 | 8/2004 | Li et al. | |
| 6,781,877 B2 | 8/2004 | Cernea et al. | |
| 6,792,113 B1 | 9/2004 | Ansell et al. | |
| 6,804,730 B1* | 10/2004 | Kawashima | 710/36 |
| 6,834,802 B2 | 12/2004 | Sukeda et al. | |
| 6,850,909 B1* | 2/2005 | Aiello et al. | 705/50 |
| 6,915,278 B1 | 7/2005 | Ferrante et al. | |
| 7,032,240 B1 | 4/2006 | Cronce et al. | |
| 7,516,495 B2* | 4/2009 | Shoemaker et al. | 726/29 |
| 7,657,742 B2* | 2/2010 | Yamada | 713/168 |
| 2001/0010044 A1* | 7/2001 | Aieta et al. | 705/50 |
| 2001/0056539 A1 | 12/2001 | Palin et al. | |
| 2003/0028797 A1 | 2/2003 | Long et al. | |
| 2003/0147278 A1 | 8/2003 | Tanaka et al. | |
| 2003/0200541 A1* | 10/2003 | Cheng et al. | 717/169 |
| 2003/0228911 A1* | 12/2003 | Dernis et al. | 463/43 |
| 2005/0216760 A1* | 9/2005 | Rabin et al. | 713/200 |
| 2005/0229259 A1* | 10/2005 | Peeters et al. | 726/32 |
| 2006/0047604 A1* | 3/2006 | Kraft-Oz et al. | 705/59 |
| 2006/0059572 A1* | 3/2006 | Shoemaker et al. | 726/29 |
| 2006/0123053 A1* | 6/2006 | Scannell, Jr. | 707/104.1 |
| 2007/0124602 A1* | 5/2007 | Wald et al. | 713/193 |
| 2007/0150884 A1 | 6/2007 | Jogand-Coulomb | |
| 2008/0289018 A1* | 11/2008 | Kawaguchi | 726/9 |

OTHER PUBLICATIONS

"iKey 1000 Series—Smart Devices for Two-Factor Authentication", *Rainbow Technologies, Inc. Product Brief*, (4/2701), 1-7.

"Sentinel UltraPro", *SafeNet Software Protection Hardware Keys*, (2005).

"Unipalm to Distribute Rainhow Technologies' iKey Range of USB Tokens in the UK and Ireland", *Unipalm Press Release*, (Aug. 19, 2003).

Final Official Action for U.S. Appl. No. 11/315,113 (Oct. 6, 2010).

Non-Final Official Action for U.S. Appl. No. 11/315,113 (Apr. 12, 2010).

"Extensible Markup Language (XML) 1.0 (Fifth Edition)," W3C Recommendation, http://www.w3.org/TR/xml/, pp. 1-63 (Nov. 26, 2008).

"DRM Content Format," OMA-TS-DRM_DCF-V2_0_2-20080723-A, Open Mobile Alliance, pp. 1-36 (Jul. 23, 2008).

"DRM Specification," OMA-TS-DRM-DRM-V2_0_2-20080723-A, Open Mobile Alliance, pp. 1-152 (Jul. 23, 2008).

"DRM Rights Expression Language," OMA-TS-DRM_REL-V2_0_2-20080723-A, Open Mobile Alliance, pp. 1-55 (Jul. 23, 2008).

"DRM Architecture," OMA-AD-DRM-V2_0_1-20080226-A, Open Mobile Alliance, pp. 1-24 (Feb. 26, 2008).

Iannella, "Open Digital Rights Language (ODRL)," Version: 1.1, pp. 1-70 (Aug. 8, 2002).

Non-Final Official Action for U.S. Appl. No. 11/315,113 (Feb. 28, 2012).

Notice of Panel Decision from Pre-Appeal Brief Review for U.S. Appl. No. 11/315,113 (Dec. 7, 2012).

Final Official Action for U.S. Appl. No. 11/315,113 (Aug. 2, 2012).

\* cited by examiner

METHOD FOR PROGRAM CODE EXECUTION WITH MEMORY STORAGE CONTROLLER PARTICIPATION

CROSS-REFERENCE TO RELATED APPLICATIONS

This application is related to U.S. patent application, Ser. No. 11/315,113, entitled "SYSTEM FOR PROGRAM CODE EXECUTION", filed on even date herewith, the disclosure of which is incorporated herein by reference in its entirety.

BACKGROUND OF THE INVENTION

1. Field of the Invention

The present invention relates to computing systems, and more particularly, to secured application program code execution using a memory storage device.

2. Background

Conventional computer systems typically include several functional components. These components may include a central processing unit (CPU), main memory, input/output ("I/O") devices, and disk drives. In conventional systems, the main memory is coupled to the CPU via a system bus or a local memory bus. The main memory is used to provide the CPU access to data and/or program information that is stored in main memory at execution time. Typically, the main memory is composed of random access memory (RAM) circuits. A computer system with the CPU and main memory is often referred to as a host system.

Host computing systems execute various types of application programs. Application program means computer code that runs on a host system from a host run time environment. Application programs include computer games, business applications (for example, Excel®, Word® and others) and other types of personal and business applications. The application may be pre-loaded on a storage device (disk drives and others) or downloaded from a remote site before execution time. The host CPU typically executes application programs after it loads an executable file into the main memory.

In conventional systems, application program execution is inadequately protected. One approach has been to use hardware "dongles" to prevent unauthorized application program code execution. The dongle approach is expensive since it requires additional hardware and the dongle does not actively participate in the overall program code execution.

Another conventional approach is to use passwords and other identifiers to provide access to application programs. This approach is ineffective if the password is compromised.

Therefore, there is a need for a method and system to secure application program code execution.

SUMMARY OF THE INVENTION

In one aspect of the present invention, a method for executing application program code is provided. The method includes loading a first segment of the application program code from a memory storage device to a host system memory; executing the first segment, wherein a host system processor executes the first segment; and authenticating application program code execution by requiring a memory controller of the memory storage device to participate in application program code execution.

In another aspect of the present invention, a method for executing application program code is provided. The method includes, executing a first segment of the application program code, wherein a host system processor executes the first segment after the first segment is loaded to a host system memory from a memory storage device; and executing a second segment of the application program code, wherein a memory storage device controller executes the second segment and participates in application program code execution.

In yet another aspect of the present invention, a method for generating revenue based on application program code execution is provided. The method includes executing a first segment of the application program code, wherein a host system processor executes the first segment after the first segment is loaded to a host system memory from a memory storage device; executing a second segment of the application program code, wherein a memory storage device controller executes the second segment and participates in application program code execution; and downloading an applet from a server, wherein the applet verifies if the host system and/or the memory storage device are valid and if the host system and the memory storage device are valid, then an entity controlling the server charges a use and/or subscription fee for applet and/or program code execution.

This brief summary has been provided so that the nature of the invention may be understood quickly. A more complete understanding of the invention can be obtained by reference to the following detailed description of the preferred embodiments thereof, in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

In one aspect of the present invention, a storage device with a controller is provided to protect application program code execution. A host computing system loads a segment(s) of an application program from the storage device and executes the segment(s). The storage device controller also executes a segment(s) of the application program and participates in the overall program execution on the host system and provides information that is related to program code execution context.

To facilitate an understanding of the preferred embodiment, the general architecture and operation of a host computing/storage device controller will first be described. The specific architecture and operation of the preferred embodiment will then be described with reference to the general architecture.

Figure 1A:
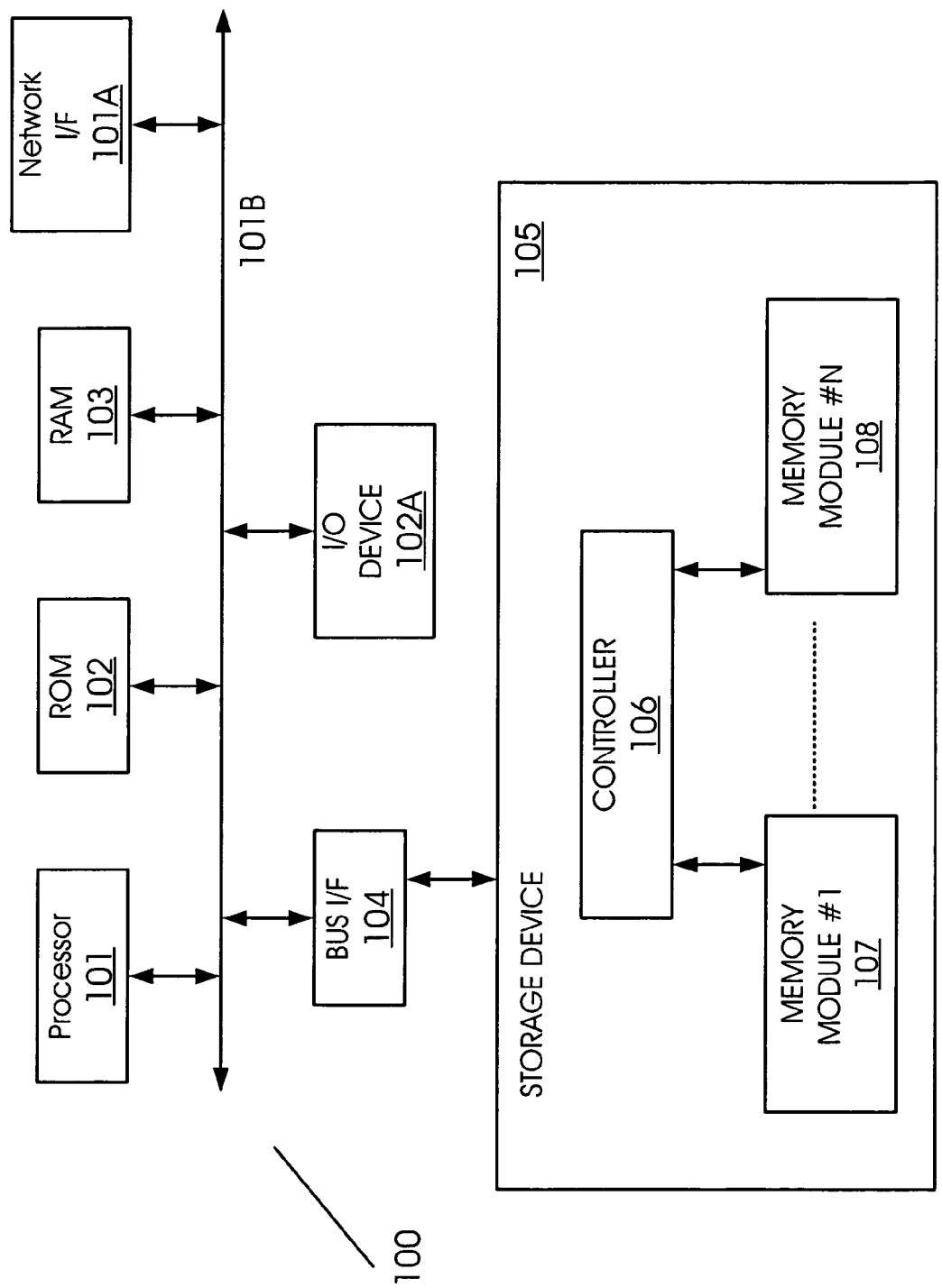
FIG. 1A shows a block diagram of a computing system, according to one aspect of the present invention.

Host System/Storage Device Controller:

FIG. 1A shows a block diagram of a typical host system 100 that includes a central processing unit ("CPU") (or microprocessor) 101 connected to a system bus 101B. Random access main memory ("RAM") 103 is also coupled to system bus 101B and provides CPU 101 with access to memory storage. When executing program instructions, CPU 101 stores those process steps in RAM 103 and executes the stored process steps out of RAM 103.

Host system 100 connects to a computer network (not shown) via network interface 101A. One such network is the Internet that allows host system 100 to download applications, code, documents and others electronic information to storage device 105.

Read only memory ("ROM") 102 is provided to store invariant instruction sequences such as start-up instruction sequences or basic Input/output operating system (BIOS) sequences.

Input/Output ("I/O") devices 102A, for example, a keyboard, a pointing device ("mouse"), a monitor, a modem and the like are also provided.

Storage device 105 provides memory storage space for computing system 100. In one aspect, storage device is a non-volatile memory device (flash device). The description below is based on a flash device; however, the adaptive aspects of the present invention can be implemented using other types of storage devices, for example, a hard disk and others.

Flash device 105 includes a controller module 106 (may also be referred to as "memory controller" or "controller") and solid-state memory modules 107-108 (shown as Memory Module #1 and Memory Module #N). Controller module 106 interfaces with host system 100 via a bus interface 104 or directly via system bus 101B or another peripheral bus (not shown).

There are currently many different flash memory cards that are commercially available, examples being the Compact-Flash (CF), the MultiMediaCard (MMC), Secure Digital (SD), miniSD, Memory Stick, SmartMedia and TransFlash cards. Although each of these cards has a unique mechanical and/or electrical interface according to its standardized specifications, the flash memory included in each is very similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers (106) that interface with the host and control operation of the flash memory within them.

Host systems that use such memory cards and flash drives are many and varied. They include personal computers (PCs), laptop and other portable computers, cellular telephones, personal digital assistants (PDAs), digital still cameras, digital movie cameras and portable audio players. The host typically includes a built-in receptacle for one or more types of memory cards or flash drives but some require adapters into which a memory card is plugged.

A NAND architecture of the memory cell arrays 107-108 is currently preferred, although other architectures, such as NOR, can also be used instead. Examples of NAND flash memories and their operation as part of a memory system may be had by reference to U.S. Pat. Nos. 5,570,315, 5,774,397, 6,046,935, 6,373,746, 6,456,528, 6,522,580, 6,771,536 and 6,781,877 and United States patent application publication no. 2003/0147278.

It is noteworthy that the present invention is not limited to any particular arrangement/type of memory cells (for example, NAND, NOR or any other type).

Figure 1B:
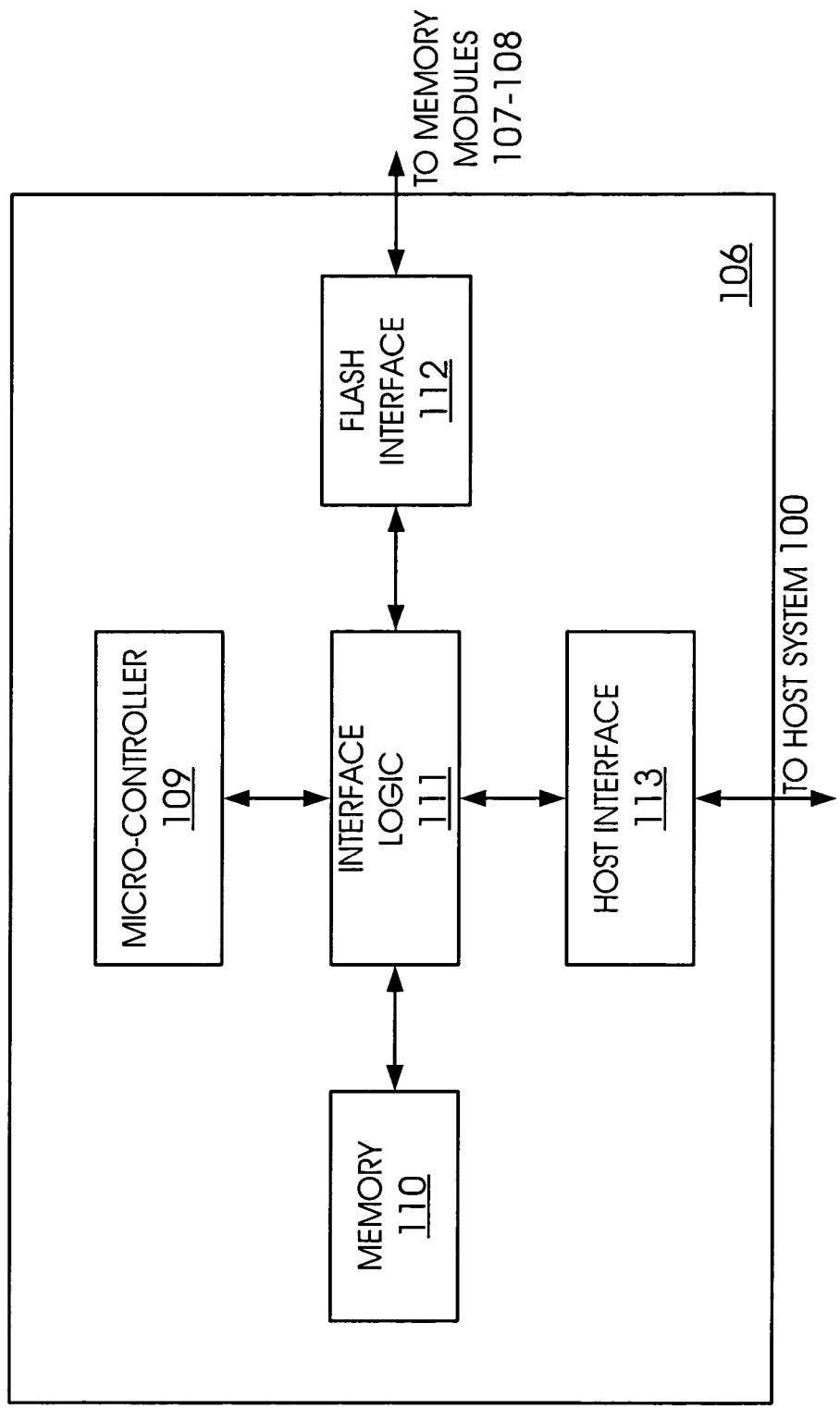
FIG. 1B shows a block diagram of a controller in FIG. 1A, according to one aspect of the present invention.

FIG. 1B shows a block diagram of the internal architecture of controller 106. Controller 106 includes a microcontroller 109 that interfaces with various other components via interface logic 111. Memory 110 stores firmware and software instructions that are used by microcontroller 109 to control the operation of flash device 105. Memory 110 may be volatile re-programmable random access memory ("RAM"), a non-volatile memory that is not re-programmable ("ROM"), a one-time programmable memory or a re-programmable flash electrically-erasable and programmable read-only memory ("EEPROM").

A host interface 113 interfaces with host system 100, while a flash interface 112 interfaces with memory modules 107-108.

Figure 2A:
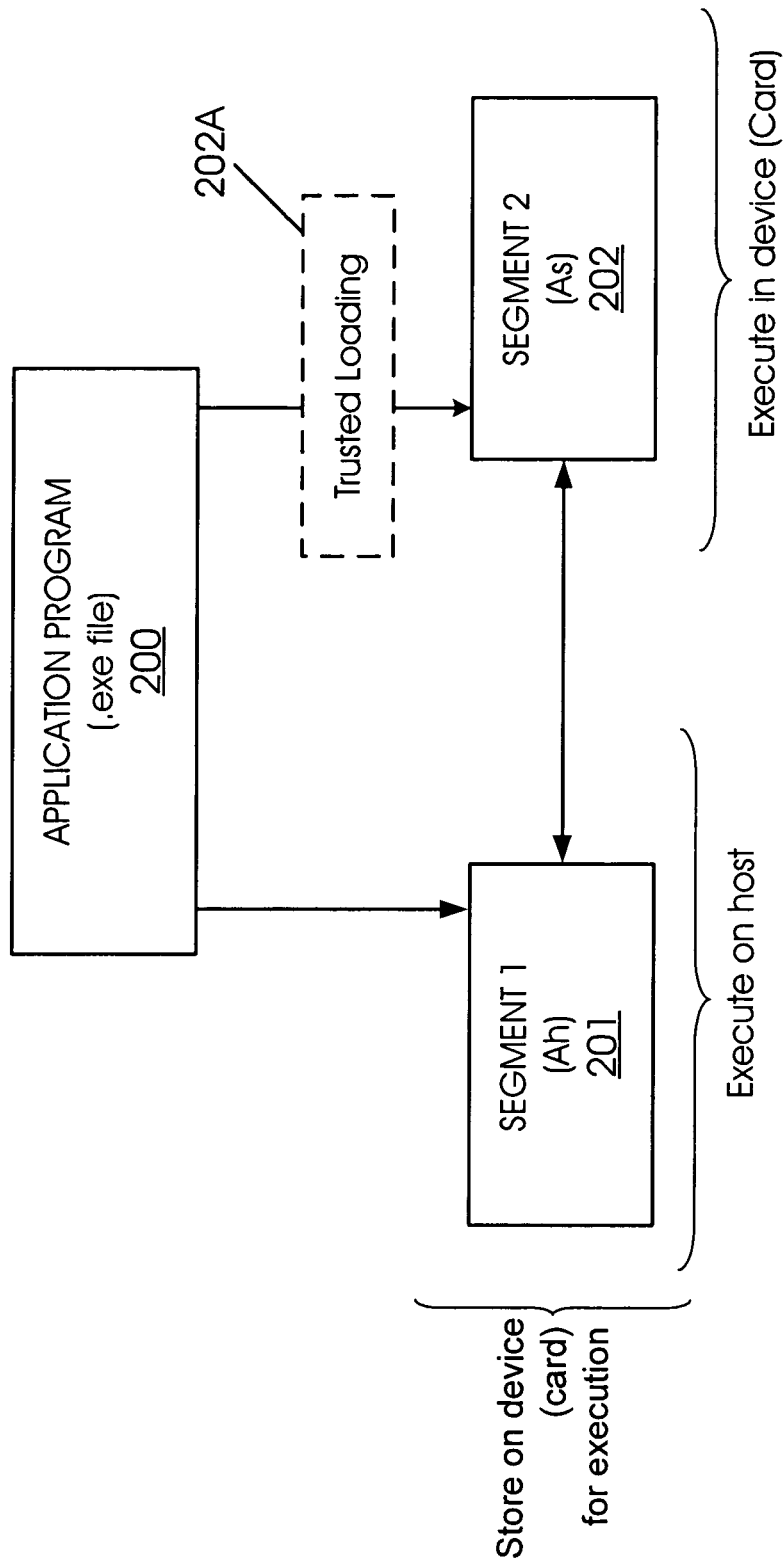
FIG. 2A shows a block diagram for storing application programs, according to one aspect of the present invention.

Application Storage:

FIG. 2A shows how an application program 200 is stored in two or more parts in storage device 105, according to one aspect of the present invention. In one aspect, application program 200 is an executable file (computer code) that can be executed by a processor. Application program 200 can be stored as segments (shown as 201 and 202) in flash device 105. Segment(s) 201 and segment(s) 202 include executable code. The size and nature of the segments will depend on the type of application. The software developer can choose the size of segments 201 and 202 to optimize overall program code execution.

Segment 201 (shown as Ah) is uploaded into RAM 103 and executed by processor 101. Segment 202 is executed by controller 106.

Segment 202 is loaded as a trusted program (shown as 202A), and runs in a trusted environment. The trusted loading (202A) can be based on a secured framework as used by "global platform" ("GP", a standard organization that has developed specification for a secured framework for smart-cards, such specifications, incorporated herein by reference in their entirety and available from a website operated by the GP organization) or Open Services gateway Initiative (OSGi, an industry forum that has developed standard specifications for a secured framework, the specification incorporated herein by reference in its entirety and available from a website operated by the OSGi forum).

Segment(s) 202 hosts portions of the application code that are used to protect the application such as specific functions, secret functions or application commands used for proper execution of the application.

During execution of segment 201, processor 101 seeks certain program related information. The program related information is based on execution of segment 202 (shown as As, application segment for storage device) by flash device 105. Controller 106 executes segment 202 and provides the information to processor 101. Controller 106 can upload segment 202 into memory 110 and then provide a response that is related to the execution application 200.

It is noteworthy that although FIG. 2A only shows two segments, application program 200 may be split into various segments. Processor 101 executes some of the segments, while controller 106 executes other segments. Flash device 105 stores application 200, the application segments are loaded in processor 101 so that they can get executed and flash device 105 executes certain segments of application 200 to provide program related information to host 100.

Figure 2B:
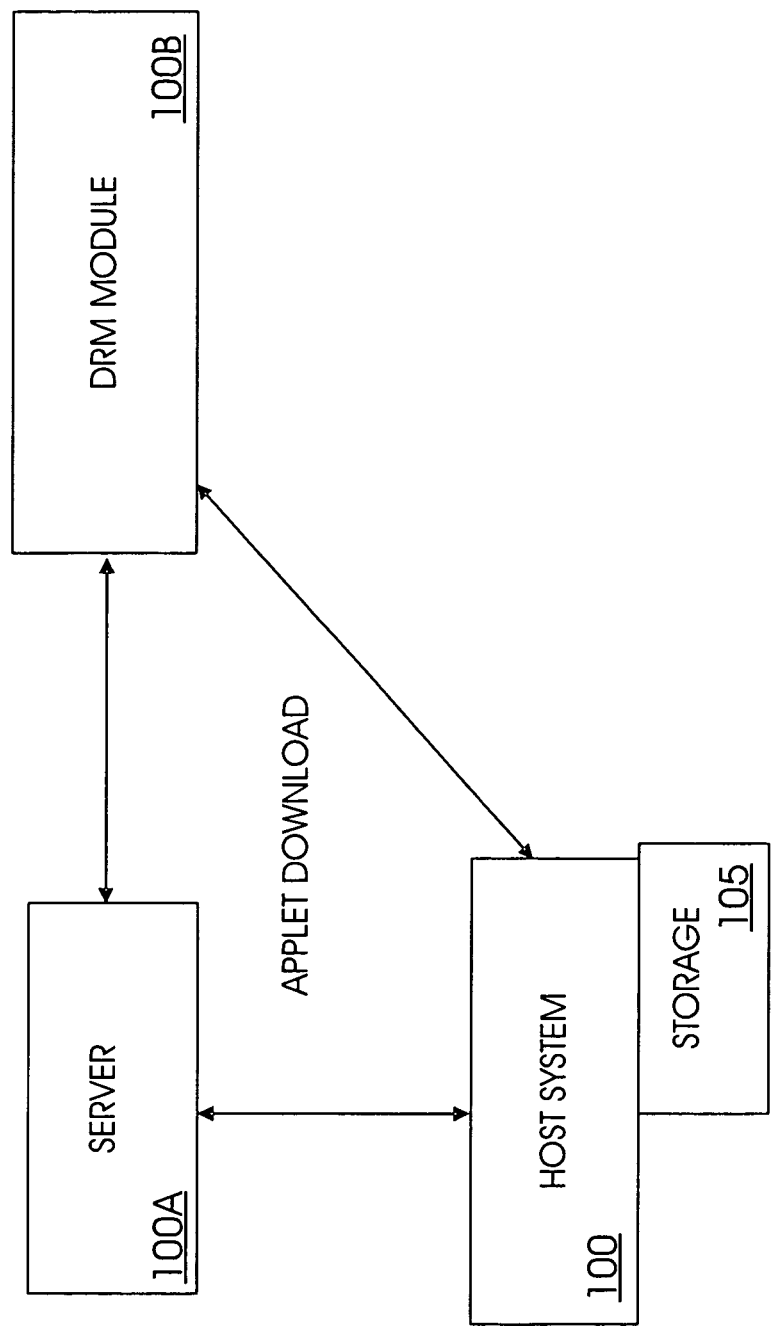
FIG. 2B shows a top-level block diagram for downloading/executing program code, according to one aspect of the present invention

FIG. 2B shows a top-level block diagram of a system where a host system 100 interfaces with flash device 105. Host system 100 connects to a server 100A via interface 101A (shown in FIG. 1A). Server 100A stores program segments/applets that can be downloaded by host system 100.

In one aspect, server 100A provides a secured applet that is used by flash device 105 to execute a program segment. The secured applet is needed for successful program execution. The entity that hosts/manages server 100A can charge a user for segment/applet downloads. In one aspect, segments/applets are protected by digital rights management (DRM).

DRM involves management of digital rights including physical manifestation of digital content (for example, a textbook or an article). DRM techniques are used to control access to digital content by enforcing controlled environments and/or encoding digital content.

The DRM module 100B interfaces with server 100A and provides the needed digital rights for the segment/applet. It is noteworthy that the DRM module 100B may include more than one entity, for example, an entity that stores the actual applet (content) and a rights issuing authority that provides the keys/licenses for applet execution.

Various standards are being used and developed to control, monitor and capitalize on digital content distribution in the commercial world. The following describes some of these standards.

The Open Digital Rights Language (ODRL) is a standard DRM architecture (incorporated herein by reference in its entirety) for protecting digital content in an open or trusted computing environment. ODRL defines a standard vocabulary for expressing the terms and conditions over an asset (digital content). Rights can be specified for a specific asset manifestation or format or could be applied to a range of manifestations of the asset. ODRL does not enforce or mandate any policy for DRM, but provides mechanisms to express such a policy. ODRL does not presume that mechanisms exist to achieve a secure architecture, but complements existing rights management standards by providing digital equivalents and supports an expandable range of new services that can be afforded by the digital nature of the assets in the Web environment. In the physical environment, ODRL can enable machine-based processing for DRM. The web site located at "www.odrl.net" includes more information about ODRL, as well as, ODRL electronic resources such as the ODRL Specification (version 1.1), the ODRL Data Dictionary (version 1.1), and the ODRL Expression Language (version 1.1), incorporated herein by reference in their entirety.

The extensible Markup Language (XML) (incorporated herein by reference in its entirety) is a standard for exchanging data and metadata electronically, where metadata describes the data. For example, the term "writer" is metadata that describes the data "CS Lewis". XML is an outgrowth of the Standard Generalized Markup Language (SGML) that allows the author of an XML document to separate the logical content of the document from the presentation of the content. An author of an XML document adds metadata to a document as hypertext transfer protocol (HTTP) tags in the document. A document type definition (DTD) file is the mechanism that adds shared content to the XML document. More information about XML is available at the web site located at "www.w3.org".

The extensible rights Markup Language (XrML) (incorporated herein by reference in its entirety) is an XML conforming language definition that specifies rights, fees, and conditions for using digital content. XrML also describes message integrity and entity authentication rules. XrML supports commerce in digital content such as publishing and selling electronic books, digital movies, digital music, interactive games, and computer software. The web site located at "www.xrml.org" includes more information about XrML.

The Open Mobile Alliance ("OMA"), a standard organization was created by consolidating the efforts of the supporters of the Open Mobile Architecture initiative and the WAP Forum with the SyncML initiative, Location Interoperability Forum (LIF), MMS Interoperability Group (MMS-IOP), Wireless Village, Mobile Gaming Interoperability Forum (MGIF), and Mobile Wireless Internet Forum (MFIW). The OMA provides an overall standard architecture (incorporated herein by reference in its entirety) that compliments existing communication standards, such as 3GPP or CDMA and also provides guidelines for controlling a mobile device, delivering and protecting content, and assists in commercial transactions using a mobile device. Details regarding the OMA architecture are available at a website located at "www.openmobilealliance.org".

Process Flow

Figure 3:
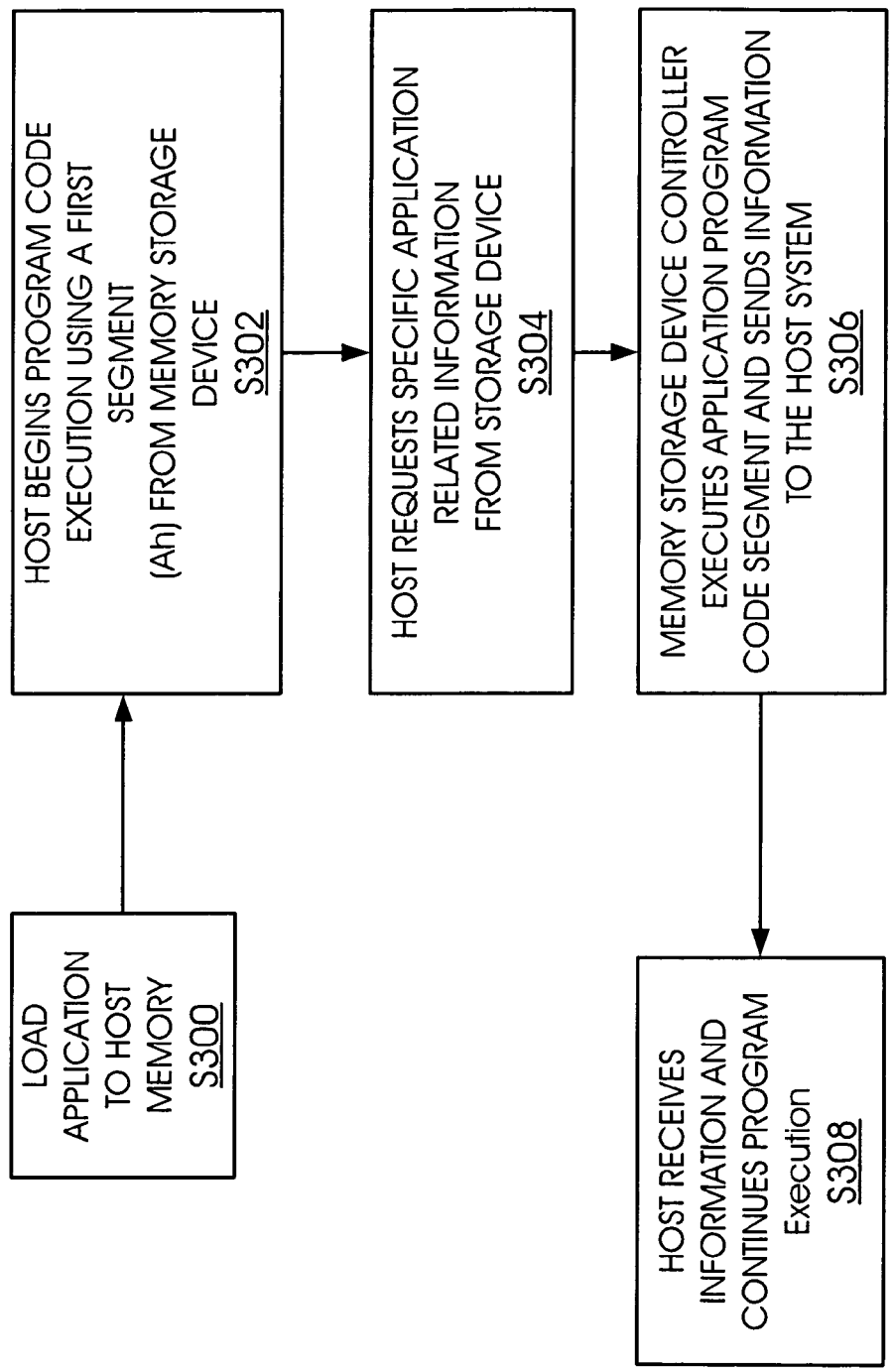
FIGS. 3-6 show process flow diagrams, according to various adaptive aspects of the present invention.

FIG. 3 shows an overall process flow diagram, according to one aspect of the present invention. In step S300, an application segment is loaded to memory 103. This occurs in response to a user request (or otherwise) for program execution. It is noteworthy that the application program code can be designed so that when it is stored in flash 105 the application is segmented, or a download utility tool segments and then stores the application program code.

In step S302, host system 100 starts executing an application program segment (Ah). Processor 101 starts executing program code from memory 103.

In step S304, while segment Ah is being executed or after segment Ah is executed, processor 101 request for a specific response. Host system 100 may provides input parameters to flash device 105.

In step S306, controller 106 executes program segment (As) using input parameters from host system 100 and sends the results to processor 101. In one aspect, controller 106 executes an applet and sends the results to processor 101. Microcontroller 109 in controller 106 executes code from memory 110 to provide a response to processor 101.

In step S308, processor 101 continues to execute the application program based on the response/results received from controller 106.

To illustrate the foregoing process steps, let the application program be a computer tennis game. The host executes a first segment of the tennis game and while the game is being played, the host waits for certain game related information, for example, certain scores, display, ball movement (path, direction, strength or any other information) and others. Controller 106 provides this information when it executes segment As.

Figure 4:
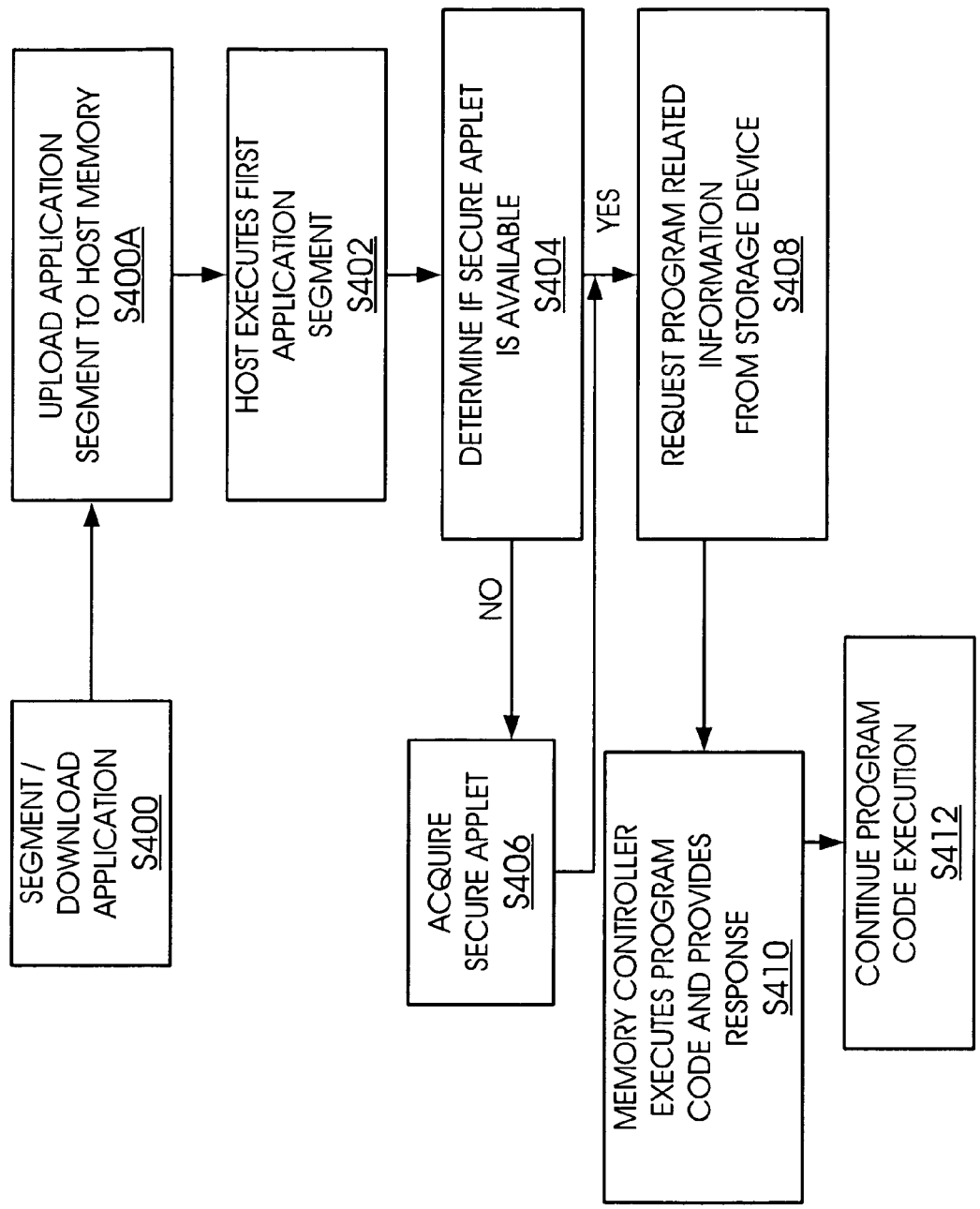

FIG. 4 shows a process flow diagram where application segment(s) are downloaded and then executed by the storage device during, according to one aspect of the present invention. In step S400, an application is segmented and the segment is downloaded and stored in flash device 105. The segments could be downloaded by Host system 100 via network interface 101A and stored on flash 105. Also, the segments can be pre-loaded on flash 105 and when flash 105 interfaces with Host system 100, the segments are loaded.

The application code can be downloaded using a secure channel (not shown). Flash device 105 itself is authenticated before application 200 is downloaded. A secured applet may also be downloaded that is used for program execution. In another aspect, the secured applet is downloaded during program execution and in real-time. The download could rely on a security framework such as "global platform" or OSGI.

It is noteworthy that the flash device 105 can store multiple applications and associated applets. The host application selects the right applet for proper program execution.

To execute and run the application, in step S400A, a part of the application program is loaded from flash device 105 to memory 103.

In step S402, processor 101 starts executing the application. In step S404, processor 101 determines if a secured applet (or computer code) is available. The applet ensures that application execution is authentic and legitimate. If a secured applet is not available or stored in flash 105, then in step S406, a secured applet is downloaded and the process moves to step S408.

In another aspect of the invention, the applet server (bOA) could verify if the host system 100 is legitimate before the download start. Also additional server functions such as payment could be handled at that time.

In step S408, host system 100 continues to execute the application. During execution, host system 100 requests a response (for example, an input or a value) from flash device 105 to continue program execution.

In step S410, controller 106 executes program segment As to provide the response. Microcontroller 109 executes program instructions (As). Once again, flash 105 participates in program execution. The response is provided to host 100 in step S412 and program code execution continues. In another aspect of the invention, the entity that controls the distribution/download of code segment As can charge a fee (subscription or use fee) to the user.

Figure 5:
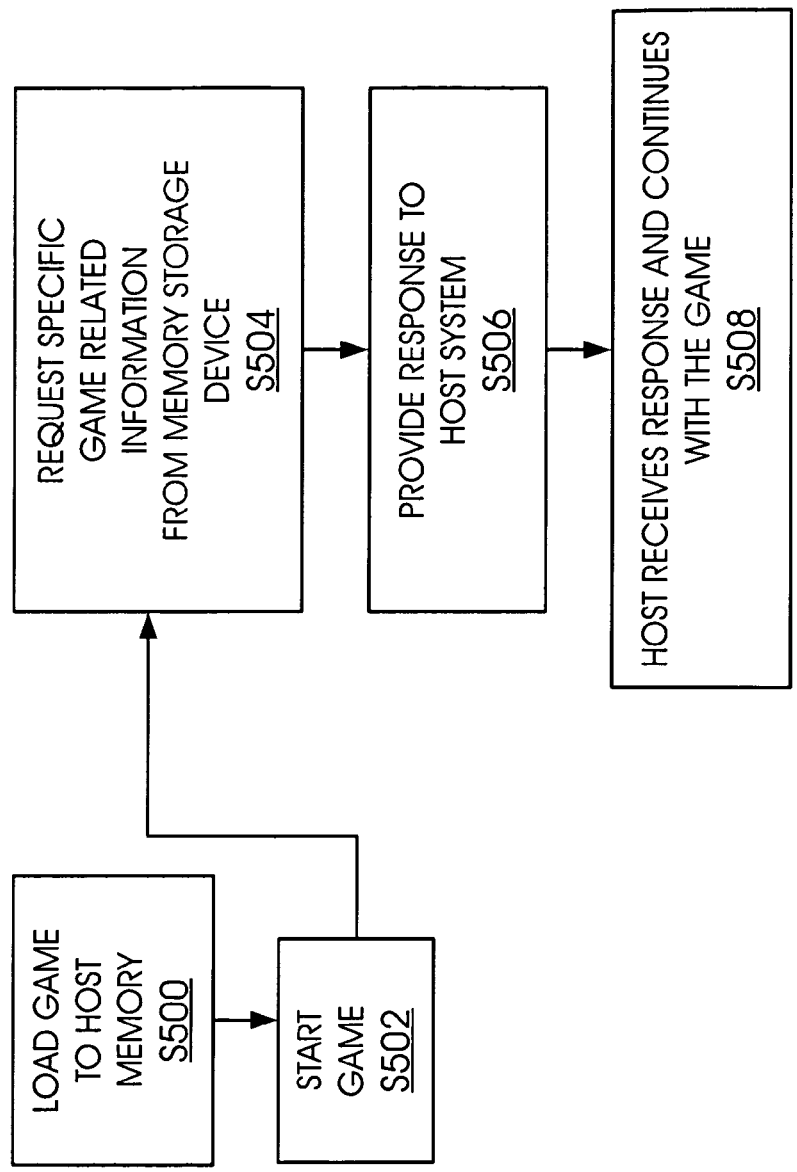
Figure 6:
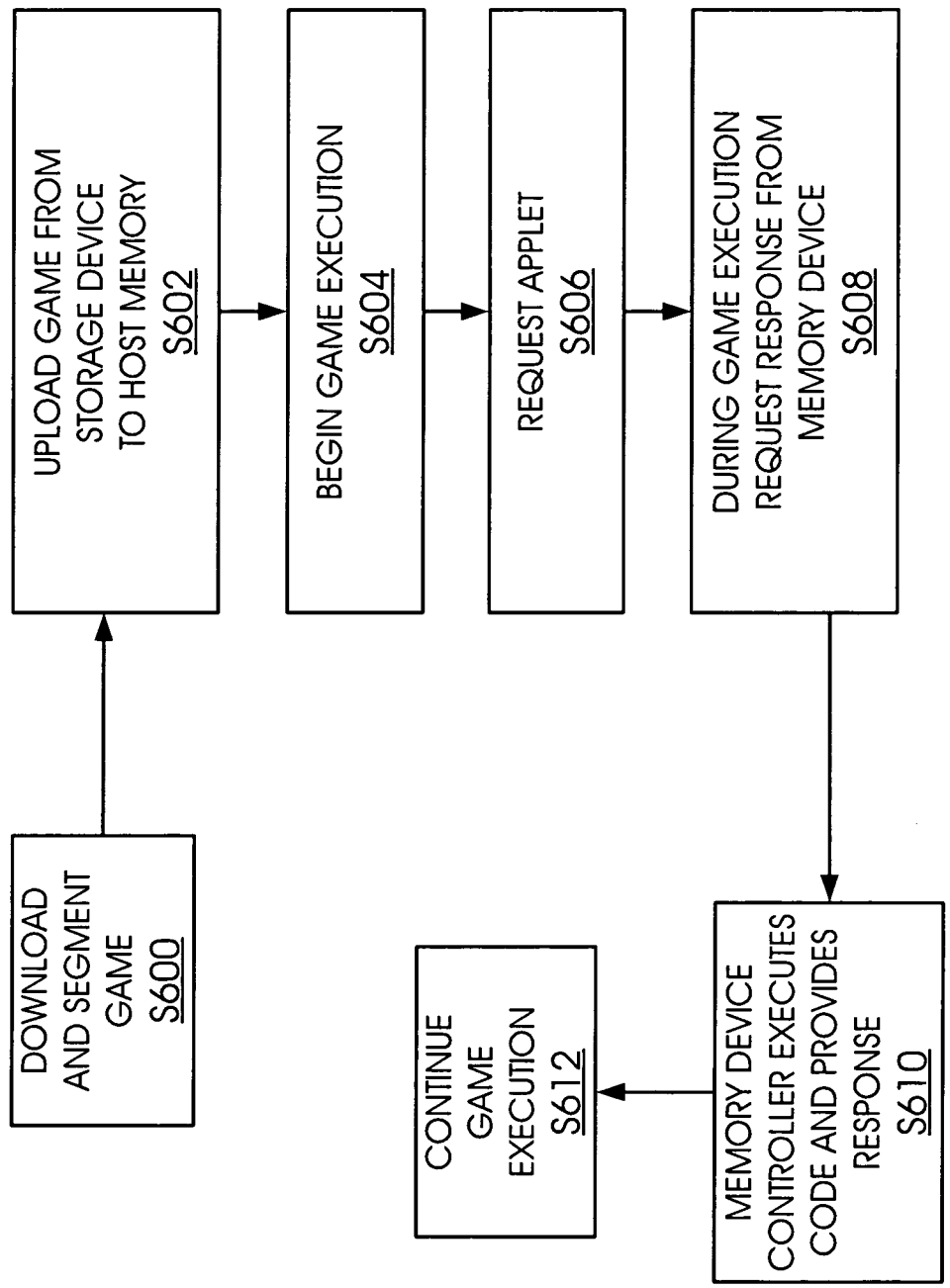

FIGS. 5 and 6 are process flow diagrams for executing applications such as computer games with flash device 105 participation, according to one aspect of the present invention. FIG. 5 is the process flow diagram for pre-loaded computer games, while FIG. 6 is based on downloaded computer games.

Turning in detail to FIG. 5, the computer game (for example application 200) is uploaded in step S500 from flash device 105 and the game starts in step S502. Processor 101 executes a first part of the game after the game is uploaded from flash device 105 to memory 103.

In step S504, while the game continues, a specific action or response is requested. Typically, the action requested is an integral part of the game. For example, if a tennis game is being played on the computer, then during the game, host system 100 requests a response to an event in the game.

In step S506, controller 106 executes program code to provide the response. The entity that controls the distribution/download of the program code can charge a fee for code execution (or downloads as discussed above).

In step S508, host system 100 receives the response and the game execution continues.

Referring now to FIG. 6, in step S600, host system 100 downloads and stores the game in flash device 105. The game is segmented, as discussed above, into two or more parts. This is similar to step S400 (FIG. 4).

In step S602, at least a first segment of the game is loaded from flash device 105 to host memory 103. In step S604, processor 101 begins game execution. In step S606, processor 101 requests a secured applet from flash device 105 (or downloads one from a remote computer via a network connection). This (i.e. having a segment of the application running in a trusted and secure run time environment) ensures that the content being executed is from an authentic source.

In step S608, processor 101 requests an action/response from flash device 105 to continue with the game.

In step S610, controller 106 executes a program segment (As) and provides a response to the host system. Thereafter, the game continues in step S612.

In one aspect of the present device, a storage device actively participates in application program code execution. This prevents hacking and unauthorized use. An applet runs in the storage device that provides dynamic and useful information to a host system for program code execution.

The storage device also combines authentication and secure loading for protected downloaded applications. In this case authentication helps validating that the device is genuine. A secure channel allows loading the application securely.

While the present invention is described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method for executing application program code, comprising:
   loading a first segment of program code of an application from a memory storage device to a host system memory;
   executing the first segment, wherein a host system processor executes the first segment; and
   authenticating execution of the program code of the application by requiring a memory controller of the memory storage device to execute a second segment of the program code of the application to participate in the execution of the program code of the application, wherein the memory storage device verifies if the host system is a valid host system to execute the program code of the application using a secured applet that is downloaded from a server.

2. The method of claim 1, wherein the second segment of the program code of the application is executed by the memory device controller, which provides a response to the processor during runtime of the program code of the application, wherein without the response, the execution of the program code of the application is discontinued.

3. The method of claim 2, wherein the first segment and the second segment are stored in the memory storage device and the first segment and the second segment are executed by different processors.

4. The method of claim 1, wherein the program code of the application is at least one of pre-loaded and downloaded on the memory storage device before the execution of the program code of the application.

5. The method of claim 1, wherein the memory storage device provides a secured applet to authenticate execution of the program code of the application.

6. The method of claim 5, wherein if a secured applet is unavailable from the memory storage device, then the secured applet is downloaded from another computer.

7. The method of claim 1, wherein the memory storage device verifies if the host system is a valid host system to execute the program code of the application using an applet that is downloaded from a server.

8. The method of claim 7, wherein an entity controlling the server can charge a fee to a user for at least one of downloading the applet and executing the program code of the application.

9. The method of claim 7, wherein at least one of: code for one or more applications is associated with the applet, and a single application is associated with more than one applet.

10. The memory storage device of claim 7, wherein the applet is loaded under a secured framework that ensures that the applet is loaded in a trusted device.

11. The method of claim 1, wherein the memory storage device is a non-volatile flash device.

12. The method of claim 1, wherein the program code of the application is for a computer game.

13. A method for executing application program code, comprising:
- executing a first segment of program code of an application, wherein a host system processor executes the first segment after the first segment is loaded to a host system memory from a memory storage device; and
- executing a second segment of the program code of the application, wherein a memory storage device controller executes the second segment and participates in the execution of the program code of the application and wherein the memory storage device verifies if the host system is a valid host system to execute the program code of the application using a secured applet that is downloaded from a server.

14. The method of claim 13, wherein execution of the second segment provides a response to the host system processor during runtime of the program code of the application, wherein without the response, the execution of the program code of the application is discontinued.

15. The method of claim 13, wherein the first segment and the second segment are stored in the memory storage device and the first segment and the second segment are executed by different processors.

16. The method of claim 13, wherein the program code of the application is at least one of pre-loaded and downloaded on the memory storage device before the execution of the program code of the application.

17. The method of claim 13, wherein the memory storage device provides a secured applet to authenticate execution of the program code of the application.

18. The method of claim 17, wherein if a secured applet is unavailable from the memory storage device, then the secured applet is downloaded from another computer.

19. The method of claim 13, wherein the memory storage device verifies if the host system is a valid host system to execute the program code of the application using an applet that is downloaded from a server.

20. The method of claim 19, wherein an entity controlling the server can charge a fee to a user for at least one of downloading the applet and executing the program code of the application.

21. The method of claim 19, wherein the code for one or more applications is associated with the applet.

22. The method of claim 19, wherein the applet is loaded under a secured framework that ensures that the applet is loaded in a trusted device.

23. The method of claim 13, wherein the memory storage device is a non-volatile flash device.

24. The method of claim 13, wherein the application comprises a computer game.

25. A method for generating revenue based on application program code execution, comprising:
- executing a first segment of program code of an application, wherein a host system processor executes the first segment after the first segment is loaded to a host system memory from a memory storage device;
- executing a second segment of the program code of the application, wherein a memory storage device controller executes the second segment and participates in the execution of the program code of the application; and
- downloading a secured applet from a server, wherein the applet verifies if at least one of the host system and the memory storage device are valid and if the host system and the memory storage device are valid, then an entity controlling the server charges at least one of a use fee and a subscription fee for at least one of applet and program code execution.

26. The method of claim 25, wherein execution of the second segment provides a response to the host system processor during runtime of the program code of the application, wherein without the response, the execution of the program code of the application is discontinued.

27. The method of claim 25, wherein the first segment and the second segment are stored in the memory storage device and the first segment and the second segment are executed by different processors.

28. The method of claim 25, wherein the program code of the application is at least one of pre-loaded and downloaded on the memory storage device before the execution of the program code of the application.

29. The method of claim 25, wherein the code for one or more applications is associated with the applet.

30. The method of claim 25, wherein the applet is loaded under a secured framework that ensures that the applet is loaded in a trusted device.

31. The method of claim 25, wherein the memory storage device is a non-volatile flash device.

32. The method of claim 25, wherein the application comprises a computer game.

* * * * *